United States Patent [19]

Tsuchiya et al.

[11] Patent Number: 5,025,491

[45] Date of Patent: Jun. 18, 1991

[54] DYNAMIC ADDRESS BINDING IN COMMUNICATION NETWORKS

[75] Inventors: Paul F. Tsuchiya, Washington, D.C.; Robert H. Stine, Arlington, Va.

[73] Assignee: The Mitre Corporation, Bedford, Mass.

[21] Appl. No.: 427,976

[22] Filed: Oct. 26, 1989

Related U.S. Application Data

[63] Continuation of Ser. No. 210,226, Jun. 23, 1988, abandoned.

[51] Int. Cl.⁵ ............................................. H04B 1/00
[52] U.S. Cl. ............................... 340/825.52; 370/94.1
[58] Field of Search ........... 340/825.5, 825.52, 825.05; 370/85.13, 85.14, 94.1, 94.3, 60, 61

[56] References Cited

U.S. PATENT DOCUMENTS

| | | | |
|---|---|---|---|
| 4,423,414 | 12/1983 | Bryant et al. | 340/825.52 |
| 4,491,946 | 1/1985 | Kryskow, Jr. et al. | 370/89 |
| 4,506,360 | 3/1985 | Kryskow, Jr. et al. | 370/85 |
| 4,706,081 | 11/1987 | Hart et al. | 370/85.13 |
| 4,715,030 | 12/1987 | Koch et al. | 370/85.13 |
| 4,718,005 | 1/1988 | Feigenbaum et al. | 340/825.52 |
| 4,823,111 | 4/1989 | Tsuchiya et al. | 370/60 |

OTHER PUBLICATIONS

Birrell et al., "A Global Authentication Service Without Global Trust", Proceedings of the 1986 IEEE Symposium on Security and Privacy, pp. 223-230.
Birrell et al., "Grapevine: An Exercise in Distributed Computing, Communications of the ACM", 25:4, pp. 260-274, 1982.
Cheriton et al., "A Decentralized Naming Facility", Stanford University Department of Computer Science, 2/1986.
Lampson, "Designing a Global Name Service", Proceedings of the Fifth Principles of Distributed Computing Conference, 8/1986.
Lantz et al., "Towards a Universal Directory Service", Fourth Sumposium on the Principles of Distributed Computing, 4/21/1988.

Lau et al., "Cluster-Based Naming for Reliable Distributed Systems", pp. 146-154, Proceedings of the Fourth Symposium on Reliability in Distributed Systems, 1984.
Lauer, "Address Servers in Hierarchical Networks", 1983.
Mockapetris, "Domain Names—Implementation and Specification", USC Information Sciences Institute, 11/1983.
Mullender, "Distributed Match-Making for Processes in Computer Networks", 1985.
Powell et al., "Process Migration in DEMOS/MP", Proceedings of the Ninth ACM Symposium on Operating System Principles, 1983.
Saltzer, "On the Naming and Binding of Network Destinations", Local Computer Networks, 1982.
Su et al., "Internetwork Accomodation of Network Dynamics: Naming and Addressing", Proceedings of the Seventh ICCC, 10/1984.
Sunshine, "Addressing Problems in Multi-network Systems", IEN 178, 4/1981.

(List continued on next page.)

Primary Examiner—Donald J. Yusko
Assistant Examiner—Dervis Magistre
Attorney, Agent, or Firm—Choate, Hall & Stewart

[57] ABSTRACT

A communications network comprising a plurality of destination stations and associated server stations, each destination station having a unique destination address, and a unique destination name containing no semantic information relating to an associated server station, each server station having a unique server address, and being capable of storing the destination address of each destination station with which it is associated, the server address being found by an algorithmic manipulation of the destination name of any destination station that is associated with the server station.

45 Claims, 6 Drawing Sheets

OTHER PUBLICATIONS

Oppen and Dalal, ACM Transactions on Office Information Systems, vol. 1, No. 3, "The Clearinghouse: A Decentralized Agent for Locating Named Objects in a Distributed Environment," Jul. 1982, pp. 230–253.

Mockapetris, P., USC Information Sciences Institute, "Domain Names—Implementation and Specification," Nov. 1983.

Shoch, John F., IEEE Proc. COMPCON, "Internet-Network Naming, Addressing, and Routing," Fall 1978, pp. 72–79.

Kleinrock, L. and Kamoun, F., Computer Networks, vol. 1, "Hierarchical Routing for Large Networks: Performance, Evaluation and Optimization," Nov. 1979, pp. 155–174.

Sedgewick, Robert, "Algorithms", 1983, Addison-Wesley Publishing Company Inc., pp. 201–210.

ADDRESS = K mod M;   M = 11

| NAMES | T | B | R | L | W | S | C | N | H | J | D |
|---|---|---|---|---|---|---|---|---|---|---|---|
| ADDRESSES | 9 | 2 | 7 | 1 | 1 | 8 | 3 | 3 | 8 | 10 | 4 |

DYNAMIC ADDRESS BINDING IN COMMUNICATION NETWORKS

This is a continuation of copending application Ser. No. 07/210,226 filed on June 23, 1988, now abandoned.

BACKGROUND OF THE INVENTION

This invention relates to communications networks consisting of a plurality of intercommunicating stations.

In communications networks, names may identify stations, and addresses may identify the locations of stations in terms of the topology of the network. In order for one station (a "source" station) to transmit a communication to another station (a "destination" station), the source station must have access to the address of the destination station. In any network in which the addresses of stations may change, there must be some means by which a source station that has access to the name of a destination station can obtain access to the address of the destination station. There must also be some means by which the information relating to the addresses of the stations can be updated as the addresses change.

In a known network each station is associated with a "server" station that stores the address of each station with which it is associated, in conjunction with each station's name. The stored information relating the name of the station with its address is known as a "binding". Embedded in the name of each station is a semantic representation of the name of the server station with which it is associated. Each station has access to a table containing the addresses of the server stations.

In this known network, a source station can obtain the name of the server station from the name of the destination station, and then obtain the address of the server station from the table. The source station then transmits a "query" to the server station, asking the server station to transmit to the source station the address of the destination station. If the server station does not have access to the binding, the server station extracts the name of a second server station from the name of the destination station. The second server station is located closer to the destination station. If the second server station does not have access to the binding, the process reiterates until the binding is found.

It is administratively clumsy to require that the name of each station have embedded within it the addresses of several server stations. Moreover, the process of making a series of queries rather than just one query results in delays. Additionally, unless redundancies are built into the network, if a server station "crashes", every station that is associated with the server station will become isolated from the rest of the network. Yet, the use of redundancies will multiply the administrative clumsiness in the naming of the stations.

In other known systems updates of bindings are flooded to every server station, and each query is directed to the server station that is nearest the source station. In yet other known systems, each binding is cached at one of many servers, and all queries flood to all server stations in the network. Flooding is wasteful of network resources, however.

In yet other known systems, all bindings are cached at a single server station for the entire network. If the single server station crashes, however, the entire system will fail. Also, the use of a single server station can create a bottleneck.

SUMMARY OF THE INVENTION

In general, the invention features a communications network including a plurality of destination stations and associated server stations. Each destination station has a unique destination address, and a unique destination name containing no semantic information relating to an associated server station. Each server station has a unique server address, and is capable of storing the destination address of each destination station with which it is associated. The server address is found by an algorithmic manipulation of the destination name of any destination station that is associated with the server station. Thus, the invention eliminates the need for semantics in the names of the stations. The names need only be globally unique. Moreover, the invention does not make use of flooding, which is wasteful of network resources.

In preferred embodiments, the algorithmic manipulation of each destination name does not implicate a server name of any server station associated with the destination station. Thus, there is no need to utilize tables that list the server addresses associated with server names, because the server addresses can be found directly by means of the algorithmic manipulation. In fact, such tables can never be utilized in a network in which each destination station can also be a server station, because it would be necessary to find every destination address merely to complete the table. Because the invention eliminates the need for such tables, there is no limit to the number of stations that can act as server stations. Every destination station and every source station can also be a server station. Thus, the invention eliminates the bottlenecks that occur when there are too few server stations.

The communications network includes a plurality of source stations capable of transmitting communications to a plurality of the destination stations. Each destination station is also a server station and a source station. Each server station is also a destination station and a source station. Each source station is also a destination station and a server station.

Each source station is capable of executing the algorithmic manipulation of the destination name of each destination station to which the source station is capable of transmitting communications, to obtain the server address of at least one server station with which the destination station is associated, and is capable of transmitting a request for the destination address of the destination station to that server station. The server station is capable of transmitting the destination address to the source station in response to the request, unless the server station does not actually store the destination address. (The server station does not actually store a destination address until the destination station instructs the server station to store the address, as described below.) The source station is capable of receiving the destination address from the server station, unless the server station does not actually store the destination address. Thus, in this embodiment, there is no need to utilize a chain of queries from one station to another to find the address of a destination station. A single query from the source station to the server station is sufficient. (Where routing in the communications network is hierarchical in nature, however, it will be necessary to utilize a chain of queries, as described below.)

Each destination station is capable of updating its destination address by executing the algorithmic manipulation of its destination name to obtain the server address of each server station with which the destination station is associated, and by transmitting an instruction to each such server station to store the destination address, or to change the destination address that the server station has stored for the destination station. Each server station with which the destination station is associated is capable of storing the destination address in response to the instruction.

The algorithmic manipulation consists of a hash relation and a resolution relation. The hash relation associates each destination name with at least one address. The resolution relation associates each address in the range of the hash relation with a server address of an operational server station.

Each server address has a unique rank. The output of the resolution relation of any input address is the address having the lowest rank that is greater than or equal to the rank of the input address and that is the rank of a server address of an operational server station. If there is no rank that is greater than or equal to the input address and that is the rank of a server address of an operational server station, the output of the resolution relation of any input address is the address having the lowest rank that is greater than or equal to the rank of the input address and that is the rank of a server address of an operational server station. If there is no rank that is greater than or equal to the input address and that is the rank of a server address of an operational server station, the output of the resolution relation of any input address is the address having the lowest rank that is the rank of a server address of an operational server station. If a server station "crashes", the algorithmic manipulation will find a new server station for all of the destination stations with which the crashed server station was associated, because the output of the resolution function must always be an operational server station. Thus, the network according to the invention is more robust than prior art networks (at least those that do not utilize flooding of bindings to many server stations). The new server station will not be able to respond to queries for a destination address, however, until the respective destination station updates its address.

In another embodiment, the communications network consists of a plurality of subnetworks of destination stations, server stations, and source stations. Each source station that is capable of executing the algorithmic manipulation is capable of selecting between two modes of the resolution relation. In the first mode, the resolution relation has a range of the set of all server addresses of operational server stations belonging to the same subnetwork as the source station. In the second mode, the resolution relation has a range of the set of all server addresses of operational server stations. Thus, a source station that does not know whether the destination station is within its own subnetwork can attempt to find a server station within its own subnetwork. If the source station cannot find a server station within its own subnetwork that will respond to the source station's query, the source station can attempt to find a server station within the global network.

In another embodiment, the algorithmic manipulation consists of a first relation and a second relation. The first relation associates each destination name with at least one of a plurality of elements in an intermediate hash space. The second relation associates each element in the intermediate hash space with at least one server address of an operational server station. In this embodiment, if the address space is unevenly populated, say an address space from 0 to 255 populated only above the address 150, the burden of storing bindings will fall proportionately to each station whose address is in the address space. Thus, the station with the first address above 150 will not share disproportionately in the burden of storing bindings.

In another embodiment, the second relation more frequently associates the elements in the intermediate hash space with the server addresses of server stations with a substantial capacity for storing destination addresses than with the server addresses of server stations with a less substantial capacity for storing destination addresses.

In another embodiment, the communications network consists of a plurality of subnetworks of destination stations, server stations, and source stations. Each source station that is capable of executing the algorithmic manipulation is capable of selecting between two modes of the second relation. In the first mode, the second relation has a range of the set of all server addresses of operational server stations belonging to the same subnetwork as the source station. In the second mode, the second relation has a range of the set of all server addresses of operational server stations.

In another embodiment, a plurality of clusters of the source stations, of the destination stations, and of the server stations are associated with a lowest hierarchical level, and one or more clusters of lower-level clusters are associated with one or more successively higher hierarchical levels. The algorithmic manipulation of the destination address of a destination station consists of the reiteration, at each hierarchical level, of an algorithmic submanipulation. At each hierarchical level other than the lowest hierarchical level, the output of the algorithmic submanipulation is a representation of at least one cluster associated with the immediately lower hierarchical level. At the lowest hierarchical level, the output of the algorithmic submanipulation is the server address of at least one server station with which the destination station is associated.

At the highest hierarchical level, each source station is capable of executing the algorithmic submanipulation of the destination name of each destination station to which the source station is capable of transmitting communications, to obtain a representation of at least one cluster associated with the immediately lower hierarchical level. At each hierarchical level other than the highest hierarchical level and the lowest hierarchical level, the above-mentioned station within the above-mentioned cluster whose representation is obtained at the immediately higher hierarchical level is capable of executing the algorithmic submanipulation to obtain a representation of at least one cluster associated with the immediately lower hierarchical level and which is a member of the higher-level cluster. At the lowest hierarchical level, the above-mentioned station within the above-mentioned cluster whose representation is obtained at the immediately higher hierarchical level is capable of executing the algorithmic submanipulation to obtain the server address of at least one server station with which the destination station is associated and which server station is a member of the above-mentioned cluster. Each source station is capable of obtaining the destination address from the server station.

At the highest hierarchical level, each destination station is capable of executing the algorithmic submanipulation of its destination name, to obtain a representation of at least one cluster associated with the immediately lower hierarchical level. Each destination station is capable of transmitting an instruction to at least one station within each such cluster to update the destination address of the destination station. At each hierarchical level other than the highest hierarchical level and the lowest hierarchical level, the above-mentioned station within each cluster whose representation is obtained at the immediately higher hierarchical level is capable of receiving the instruction, and is capable of transmitting the instruction to at last one station within each cluster which is a member of the above-mentioned cluster and whose representation is obtained at the present hierarchical level by means of the algorithmic submanipulation. At the lowest hierarchical level, the above-mentioned station within each cluster whose representation is obtained at the immediately higher hierarchical level is capable of receiving the instruction, and is capable of transmitting the instruction to each server station whose address is obtained at the lowest hierarchical level by means of the algorithmic submanipulation and which server station is a member of the above-mentioned cluster. Each server station is capable of storing the destination address or changing the destination address that the server station has stored, in response to the instruction. Thus, the destination station is capable of transmitting the instruction to each server station with which the destination station is associated.

At least one hierarchical level, the algorithmic submanipulation consists of a first relation and a second relation. The first relation associates each input to the algorithmic submanipulation with at least one of a plurality of elements in an intermediate hash space. The second relation associates each element in the intermediate hash space with at least one output of the algorithmic submanipulation.

At the lowest hierarchical level, the second relation more frequently associates the elements in the intermediate hash space with the server addresses of server stations that have a substantial capacity for storing destination addresses than with the server addresses of server stations that have a less substantial capacity for storing destination addresses. At all other hierarchical levels, the second relation more frequently associates the elements in the intermediate hash space with representations of clusters for which the server stations that are members of the clusters have a substantial capacity for storing destination addresses than with the representations of clusters for which the server stations that are members of the clusters have a less substantial capacity for storing destination addresses.

In another embodiment, one or more destination names contain a representation of the number of server stations with which the respective destination station is associated. The algorithmic manipulation produces a plurality of outputs. Each station that is capable of executing the algorithmic manipulation of the destination name of a destination station is capable of receiving the representation, and is capable of ignoring outputs of the algorithmic manipulation that correspond to the server name of a server station with which the destination station is not actually associated. Thus, popular destinations can distribute their binding updates to more than one server, so that there will not be a bottleneck of queries flowing into a single server. This embodiment does require the use of semantics in destination names, however.

In another embodiment, each destination station is associated with a plurality of server stations, and each source station that is capable of executing the algorithmic manipulation obtains each destination address from the server station with which the source station can most conveniently communicate. The number of server stations with which each destination station is associated is 3 or 4. By providing for 3 or 4 server stations for each destination station, this embodiment maximizes the advantages of there being a server station reasonably close to any source station, as compared with the disadvantage of additional storage requirements for bindings and additional processing requirements. Moreover, if one server station crashes, a source station can obtain the destination address of a destination station from another server station with which the destination station is associated.

In another aspect, the invention features a method of finding the server address of a server station associated with a destination station. The method consists of the execution of an algorithmic manipulation of the destination name of the destination station.

In another aspect, the invention features a method whereby each source station can obtain the destination address of each destination station to which the source station is capable of transmitting communications.

In another aspect, the invention features a method whereby each destination station can update its destination address.

Other features and advantages of the invention will be apparent from the following description of the preferred embodiments, and from the claims.

DESCRIPTION OF THE PREFERRED EMBODIMENTS

We first briefly describe the drawing.

DRAWINGS

STRUCTURE AND OPERATION

Figure 1:
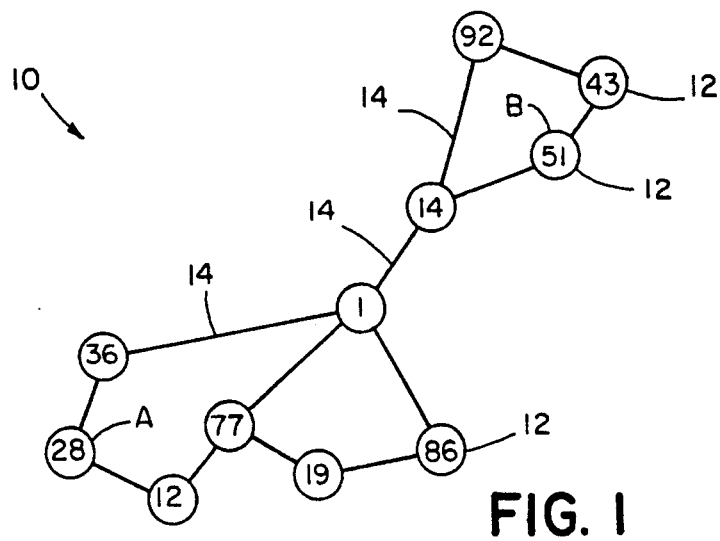
FIG. 1 is a schematic representation of a network of communications stations according to the invention.

There is shown in FIG. 1 a communications network 10 consisting of communications stations 12. Each station can transmit communications to and receive communications from any other station along communications paths 14. Each station 12 has a name and an address. In FIG. 1 the addresses of the various stations are taken out of the address space that consists of the numbers from 0 to 99, and the addresses are shown inside the circles representing the various stations. The addresses of the stations can therefore be ranked, with increasing addresses representing an increase in rank. In general, each station 12 stores the name of every other station, but does not store the address of every other station, because the addresses of the various stations may change with time. Each station 12 is associated with a server station.

Figure 2:
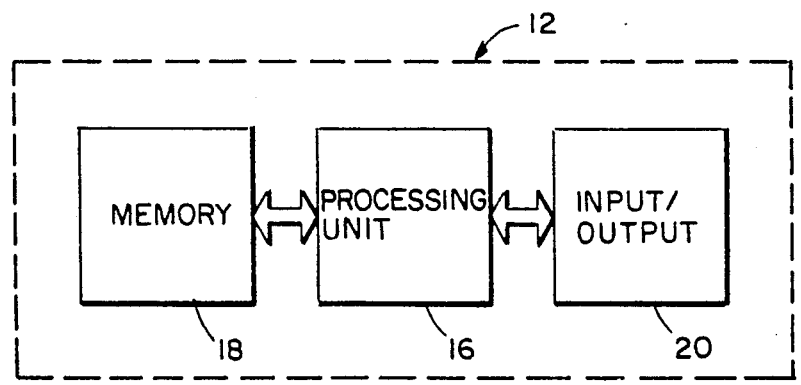
FIG. 2 is a block diagram of a communication station from the network of FIG. 1.

There is shown in FIG. 2 a communications station 12. Each such communications station has a processing unit 16 for performing algorithmic manipulations and for the other processing of information described in this specification, a memory 18 for storing data, and an input/output unit 20 for transmitting and receiving communications to and from the other communications stations 12.

In order for a source station to transmit communications to a destination station, the source station must possess the address of the destination station. The source station can obtain the address of the destination station by transmitting a "query" for the address to the server station that is associated with the destination station. In response to the query, the server station will transmit the address to the source station.

The source station cannot transmit a query to the server station unless the source station possesses the address of the server station. The source station can obtain the address of the server station by executing an algorithmic manipulation upon the name of the destination station. The algorithmic manipulation maps the name of each destination station onto the address of its server station. The names of the destination stations can be arbitrary, however, because the server station associated with a given destination station can be any arbitrary station. The names of the various destination stations need not contain any semantic information identifying the server stations with which they are associated.

Thus in order for a source station to transmit a communication to a destination station, the source station must first execute the algorithmic manipulation upon the name of the destination station to obtain the address of the server station with which the destination station is associated. The source station must then transmit a query to the server station and receive from the server station the address of the destination station. The source station can then transmit the communication to the destination station.

Figure 3:
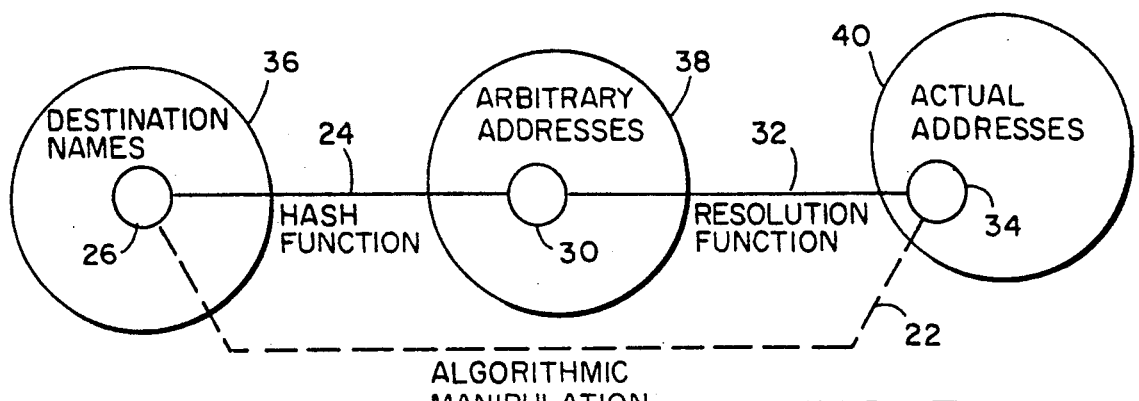
FIG. 3 is a schematic representation, using Venn diagrams, of an algorithmic manipulation of the name of a destination station, according to the invention.
Figure 8:
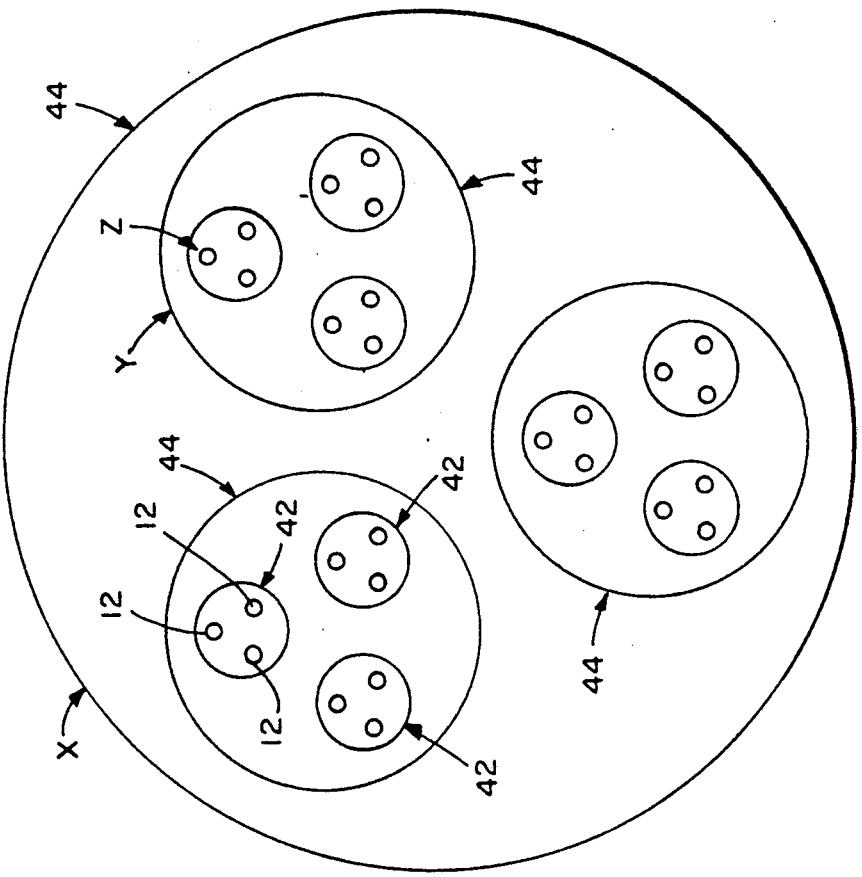
FIG. 8 is a chart illustrating a simple hash function that assigns address numbers to single-letter names.

As shown in FIG. 3, the algorithmic manipulation 22 is the combination of a hash function 24 that maps the name 26 of the destination station to an arbitrary address 30 that may or may not be the actual address of a station, and a resolution function 32 that maps the arbitrary address 30 to an actual address 34 of a station. Hash functions are well known in the art. A simple example is shown in FIG. 8, in which a hash function maps any given single-letter "name" onto the arbitrary address k mod M, where K is a number representing the position of the letter in the alphabet and M is the upper limit on the range of arbitrary addresses. The output of the resolution function 32 may be simply the lowest actual address that is greater than or equal to the arbitrary address 30, or, if there is no such actual address, the output of the resolution function 32 may be the lowest actual address. The set of all destination names constitutes the doman 36 of the hash function 24, and the set of all possible outputs of the hash function constitutes the range 38 of the hash function 24. The range 38 of the hash function 24 constitutes the domain of the resolution function 32, and the set of all actual addresses constitutes the range 40 of the resolution function.

In order for a station to execute the resolution function, the station must have access to a list of current addresses at which operational stations are located. Such information is readily available in any network in which routing decisions must be made, because no routing of communications between two stations can be allowed to flow through an address at which there is no station. Such networks typically utilize routing tables, which are updated to list all of the addresses in the network at which operational stations are currently located. For a discussion of routing tables and storage of the addresses of operational station, see Kleinrock, L. and Kamoun, F. (1977), "Hierarchical Routing for Large Networks: Performance Evaluation and Optimization," *Computer Networks*, Vol. 1, pp. 155-174. In networks according to the invention, of course, is not possible to discern the address of a particular station from such a routing table alone, where only the name of the station is known.

Each destination station must be able to update its binding when the destination station changes its address. The destination station first executes the algorithmic manipulation upon its own name, to obtain the address of the server station with which the destination station is associated. The destination station then transmits an instruction to the server station to change the binding that the server station has stored for the destination station to reflect the new address.

Figure 9:
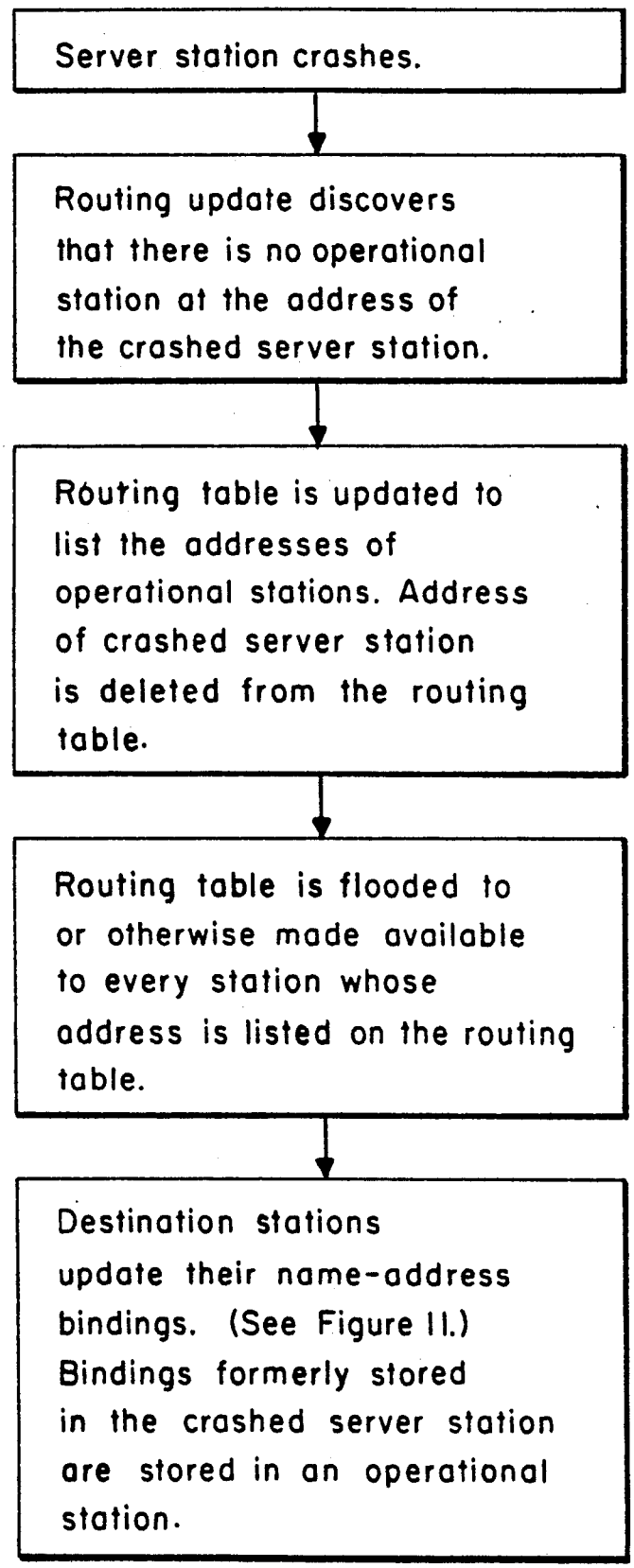
FIG. 9 is a flowchart illustrating the updating of a routing table after the "crash" of a server station.

Occasionally, a server station might "crash", and the binding information might therefore be lost for the destination stations with which the crashed server station is associated. As shown in the flowchart of FIG. 9, when a station crashes, the address of the crashed station is removed from the routing table when the next routing update occurs. Recall that the routing table lists the addresses at which operational stations are currently located. If a server station crashes, the resolution function of the algorithmic manipulation will map onto the address of a new server station, because the address of the crashed server station will no longer be on the list of current addresses at which operational stations are located. It is therefore important, when a destination station updates its binding, that the destination station instruct its server station to create a new binding if one does not already exist.

Figure 10:
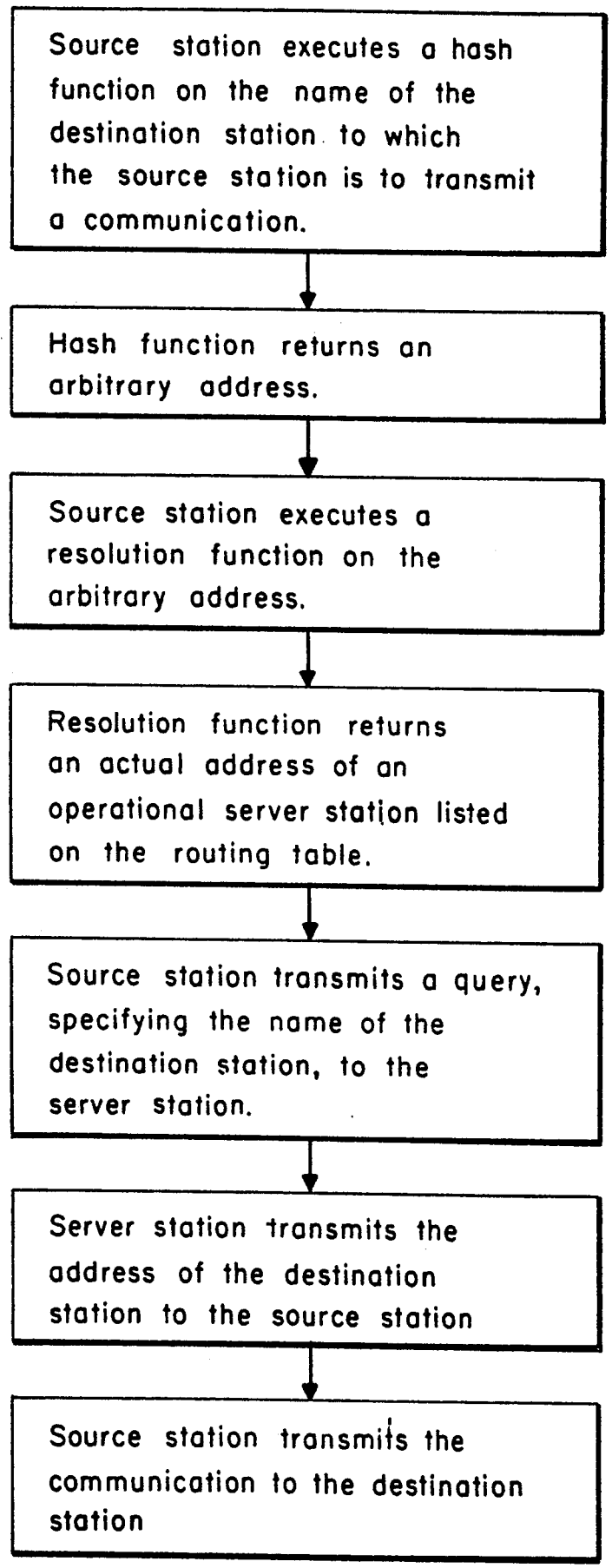
FIG. 10 is a flowchart illustrating how a source station executes a hash function and a resolution function to obtain the address of a server station that stores a name-address binding of a destination station.

Referring to FIG. 1, and the flowchart of FIG. 10 if the station named "B" at address 51 is a source station, and the station named "A" at address 28 is the destination station to which the source station is to transmit a communication, the source station must proceed by first executing the hash function on the name "A". The hash function might map the name "A" onto the address 79, for example. The source station must then execute the resolution function on the address 79. The resolution function maps the address 79 onto the address 86, which is the first address greater than or equal to 79 at which an operational station is located. The source station must then transmit a query to the station located at address 86, which is the server station with which the destination station is associated. The server station responds to the query by transmitting to the source station the address 28, which is the address of the destination station named in the query. The source station can then transmit the communication to the destination station.

Figure 11:
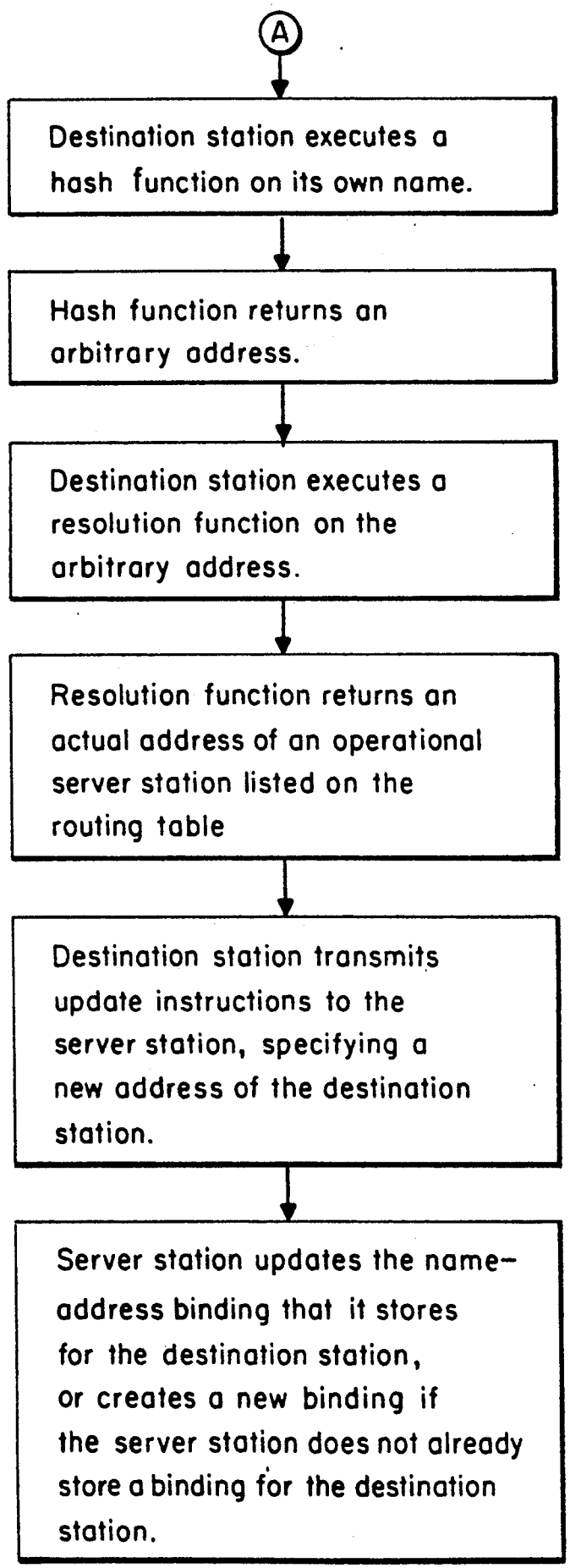
FIG. 11 is a flowchart illustrating how a destination station executes a hash function and a resolution function to obtain the address of a server station to which the destination station delivers a name-address binding update for the destination station.

As shown in the flowchart of FIG. 11, the destination station updates its binding by first executing the hash function on the name "A". The hash function maps the name "A" onto the address 79. The destination station then executes the resolution function on the address 79. The resolution function maps the address 79 onto the address 86. The destination station then transmits the update instructions to the station located at address 86, which is the server station with which the destination station is associated. The server station responds by changing the binding that the server station has stored for the destination station to reflect the new address. If the server station has not already stored a binding for the destination station, the server station creates a new binding.

Figure 4:
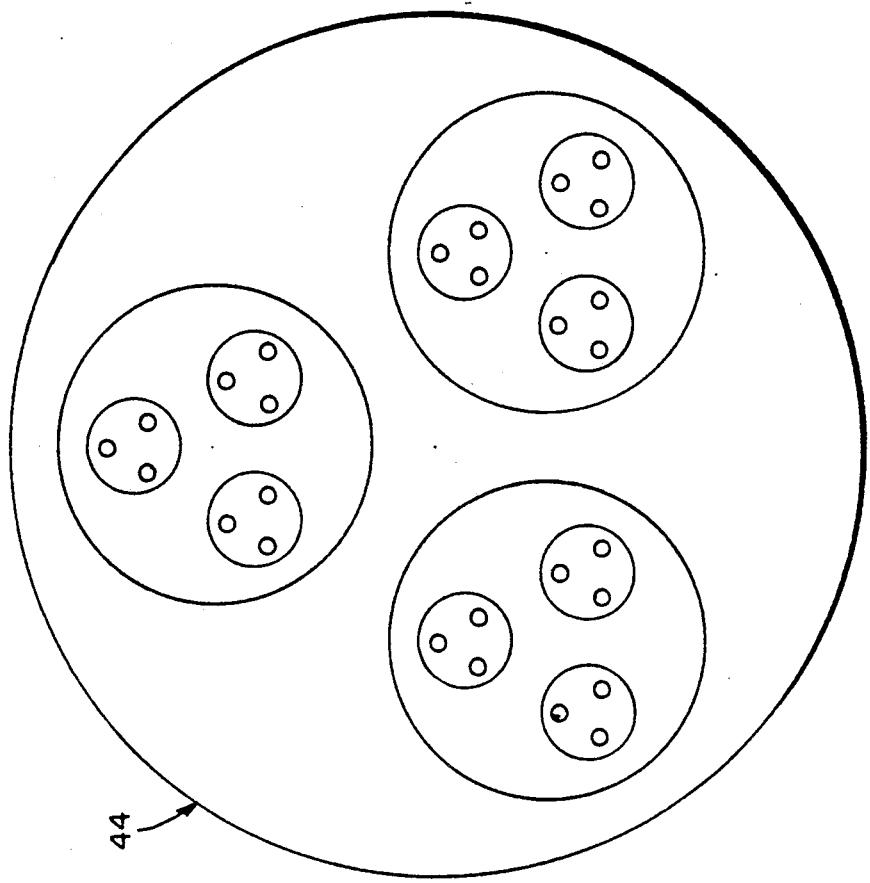
FIG. 4 is a diagram of hierarchical levels of clusters of communications stations, according to the invention.

In FIG. 4 there is shown one embodiment of the invention, in which the source stations, server stations and destination stations 12 are organized into clusters 42. The clusters may in turn be organized into clusters 44 of clusters, at progressively higher hierarchical levels. Each station 12 has access to a list of all of the addresses of the stations that are members of its own lowest level cluster 42. Each station 12 also has access to a list of all of the clusters of each hierarchical level that are members of the cluster of the next highest hierarchical level within which the station is located.

The stations do not have access to a list of all of the addresses in the entire network at which operational stations are located. Thus, if the stations attempt to execute the algorithmic manipulation as outlined above, the output of the resolution function will vary depending on which station executes it. To solve this problem, the algorithmic manipulation takes place in hierarchical stages. A source station can obtain the address of a destination station by first executing a hash function on the name of the destination station, then executing a resolution function whose output is one of the highest-level clusters. For example, the output of the resolution function might be the highest-level cluster labelled "X" in FIG. 4. The source station then transmits a query to a station within that highest-level cluster. The station that receives the query executes a hash function, then executes a resolution function whose output is a cluster of the next-highest level, for example, the cluster labelled "Y" in FIG. 4. The process repeats itself until, at the lowest hierarchical level, the output of the resolution function is the address of a server station, for example, the station labelled "Z" in FIG. 4. The server station receives the query, and transmits the address of the destination station to the source station.

A destination station can update its binding by first executing a hash function on its own name, then executing a resolution function whose output is one of the highest-level clusters. The destination station then transmits the update instructions to a station within the highest-level cluster. The station that receives the update instructions executes a hash function, then executes a resolution function whose output is a cluster of the next-highest level. The process repeats itself until, at the lowest hierarchical level, the output of the resolution function is the address of a server station, which receives the update instructions.

In some circumstances, the distribution of addresses may be uneven. For example, in an address space that ranges from 0 to 255, all of the addresses of operational stations might be numbers greater than 150. Whenever the hash function produces as its output a number between 0 and 150, the resolution function will produce as its output the first address after 150 that corresponds to an operational station. That station will experience a disproportionate burden as a server station.

Figure 5:
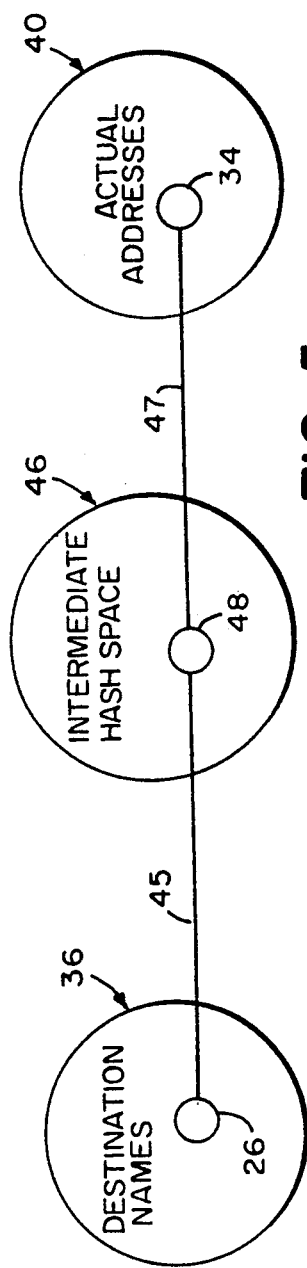
FIG. 5 is a schematic representation, using Venn diagrams, of the use of an intermediate hash space according to the invention.

To resolve this problem, in another embodiment of the invention illustrated in FIG. 5, the algorithmic manipulation 28 maps destination names 26 into an intermediate hash space 46 rather than directly into the address space 40. Each element 48 in the intermediate hash space 44 is in turn mapped onto an address 34 of an operational station, by the second mapping function 47. The addresses from the list of addresses of operational stations are hashed into the intermediate hash space 46 evenly, so that the various addresses 34 are all paired with roughly the same number of elements 48 in the intermediate hash space 46.

In another embodiment, the algorithmic manipulation maps destination names into an intermediate hash space, but the addresses of the operational stations are not hashed into the intermediate hash space evenly. Rather, the addresses of stations with a high capacity for binding are hashed into the intermediate hash space frequently, and the addresses of stations with a low capacity for binding are hashed into the intermediate hash space infrequently, or not at all. If the hierarchical system of clusters is used, then, at each hierarchical level other than the lowest, the elements in the intermediate hash space are associated more frequently with clusters in which the stations on aggregate have a high capacity for binding than with clusters in which the stations on aggregate have a low capacity for binding. At the lowest hierarchical level, of course, the elements in the intermediate hash space are associated more frequently with individual stations having a high capacity for binding than with stations having a low capacity for binding.

Figure 6:
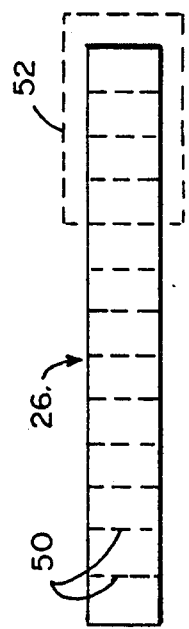
FIG. 6 is a schematic representation of the name of a communications station according to the invention, the name including an indication of the number of server stations with which the communications station is associated.

In another embodiment the various stations may be associated with more than one server station. Popular destination stations may be associated with many server stations, whereas unpopular destination stations may be associated with few server stations, or only one server station. Unfortunately as shown in FIG. 6, the name 26 of each station shown as a string of characters 50, must include an indication 52 of the number of server stations with which the station is associated. In this embodiment, the algorithmic manipulation has more than one output. Thus, when a station executes the algorithmic manipulation, the station must ignore all outputs of the algorithmic manipulation beyond the number of outputs equal to the number of server stations with which the destination station is associated. The station that executes the algorithmic manipulation obtains this number from the name of the destination station.

In another embodiment, each of the stations is associated with the same number of server stations, which number is greater than one. Each source station can transmit each query to the server station with which the source station can most conveniently communicate. The distance that each query, on average need travel to reach a server station is shorter than the distance required when each station is associated with only one server station. On the other hand, more hashes must be executed on each name to obtain the multiple addresses, and more binding capacity is needed throughout the network to store the redundant bindings.

Assume for the sake of simplicity that the number of stations that are one link away from a source station is roughly equal to the number of stations that are two links away, and so forth. (This assumption is not entirely accurate, but will suffice for purposes of this example.) If each station is associated with only one server station, then queries, on average, will travel half the diameter of the network to reach a server station. If each station is associated with two stations, then queries will travel one third the diameter, and so forth. Because of the diminishing returns from the investment in processing resources and storage requirements for bindings, an optimal number of server stations per destination station has been found to be 3 or 4 server stations, in typical networks.

Moreover, if each station is associated with more than one server station, then if one server station "crashes", a source station can query another server station with which the destination station is associated. The query to the crashed server station will not result in a response to the source station. When the source station notices the absence of a response, the source station will query another server station.

Figure 7:
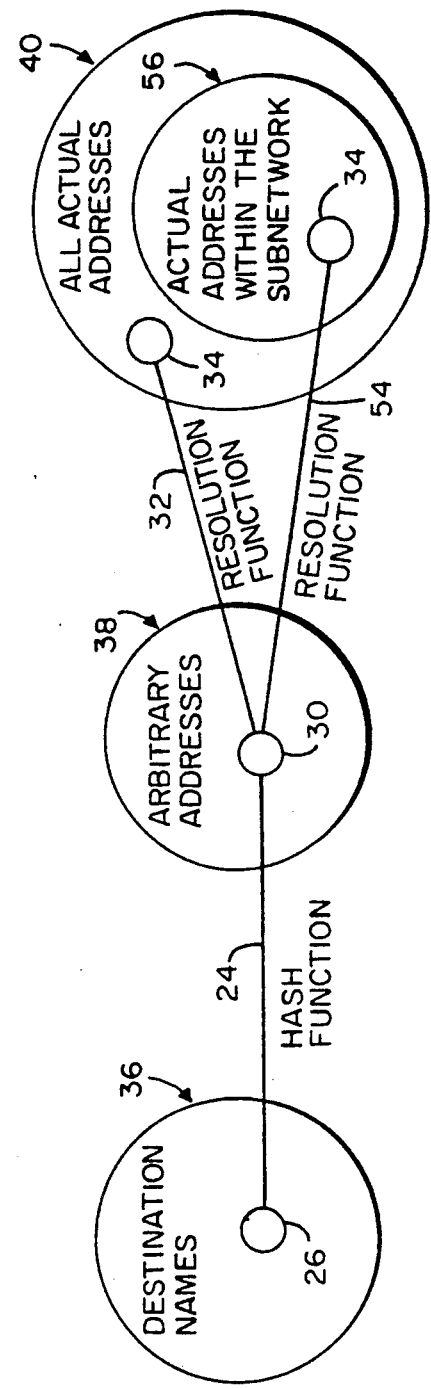
FIG. 7 is a schematic representation, using Venn diagrams, of an algorithmic manipulation of the name of a destination station, the algorithmic manipulation including two modes of a resolution relation selectable according to the invention by a source station.

In another embodiment, the communications network consists of several subnetworks. Each destination station is associated with a server station located within the destination station's own subnetwork. As shown in FIG. 7, any source station within that subnetwork can obtain the address of the server station by executing a hash function 24 upon the name 26 of the destination station, then executing a resolution function 54 upon the output 30 of the hash function 24, where the range 56 of the resolution function 54 is the set of addresses 34 within that subnetwork. If the source station cannot determine from the name of the destination station whether the destination station is a member of the source station's own subnetwork, the source station can first execute a resolution function 54 having a range 56 limited to the set of addresses 34 in the source station's subnetwork. Then, if the source station does not receive a destination address from the server station, the source station can execute another resolution function 32 having as its range 40 the set of all addresses 34 in the entire communications network.

If an intermediate hash space is used, the source station can first execute the algorithmic manipulation using an intermediate hash space into which only the addresses within the source station's network are hashed. Then, if the source station does not receive a destination address from the server station, the source station can execute the algorithmic manipulation using an intermediate hash space into which all of the addresses in the entire communications network are hashed.

What is claimed is:

1. A communication network comprising
   a plurality of destination stations and associated server stations,
   each destination station having a unique destination address,
   each server station having a unique server address,
   each destination station having a unique destination name containing no predetermined indication of the address of an associated server station and no predetermined indication of a name of an associated server station,
   each server station comprising means for storing the destination address of each destination station in which it is associated,
   the server address being found by an algorithmic manipulation of the destination name of any destination station that is associated with the server station, the algorithmic manipulation producing an output that changes in accordance with changes in a routing table containing addresses of operational server stations, so that the server address found by the algorithmic manipulation is always a server address listed on the routing table.

2. The communication network of claim 1 further comprising at least one source station, said source station comprising means for transmitting communications to a plurality of the destination stations.

3. The communications network of claim 2,
   each source station further comprising means for executing the algorithmic manipulation of the destination name of each destination station to which the source station transmits communications, to obtain the server address of at least one server station with which the destination station is associated, and further comprising means for transmitting a request for the destination address of the destination station to the at least one server station with which the destination station is associated,
   the at least one server station comprising means for transmitting the destination address to the source station in response to the request, unless that at least one server station does not actually store the destination address, and
   the source station comprising means for receiving the destination address from the at least one server station, unless the at least one server station does not actually store the destination address.

4. The communications network of claim 3,
   each destination station comprising means for executing the algorithmic manipulation of its destination name to obtain the server address of each server station with which the destination station is associated, and comprising means for transmitting an instruction to each server with which the destination station is associated to store the destination address, and
   each server station with which the destination station is associated comprising means for storing the destination address in response to the instruction,
   whereby the destination station can update its destination address.

5. The communications network of claim 4,
   the algorithmic manipulation comprising a hash relation and a resolution relation.
   the hash relation having a domain comprising each destination name and having a range comprising a plurality of addresses, the hash relation associating each destination name with at least one address, and the resolution relation having a domain comprising each address in the range of the hash relation and having a range comprising each server address of an operation server station, the resolution relation associating each address in the range of the hash relation with a server address of an operational server station.

6. The communications network of claim 5,
each server address having a unique rank, and
the output of the resolution relation of any input address being the address having the lowest rank that is greater than or equal to the rank of the input address and that is the rank of a server address of an operational server station.

7. The communications network of claim 6, wherein, if there is no rank that is greater than or equal to the input address and that is the rank of a server address of an operational server station, the output of the resolution relation of any input address is the address having the lowest rank that is the rank of a server address of an operational server station.

8. The communications network of claim 4,
each destination station also being a source station with respect to all destination stations other than itself, and
each source station also being a destination station with respect to all source stations other than itself.

9. The communications network of claim 8 each server station also being a destination station and a source station.

10. The communications network of claim 9,
each destination station also being a server station, and
each source station also being a server station.

11. The communications network of claim 4, the algorithmic manipulation comprising a first relation and a second relation,
the first relation associating each destination name with at least one of a plurality of elements in an intermediate hash space, and
the second relation associating each element in the intermediate hash space with at least one server address of an operational server station.

12. The communications network of claim 11, the second relation more frequently associating the elements in the intermediate hash space with the server addresses of server stations having a substantial capacity for storing destination addresses than with the server addresses of server stations having a less substantial capacity for storing destination addresses.

13. The communications network of claim 2,
a plurality of clusters of the source stations, of the destination stations, and of the server stations being associated with a lowest hierarchical level, and one or more clusters of lower-level clusters being associated with one or more successively higher hierarchical levels,
the algorithmic manipulation of the destination address of a destination station comprising the reiteration, at each hierarchical level, of an algorithmic submanipulation,
at each hierarchical level other than the lowest hierarchical level, the output of the algorithmic submanipulation being a representation of at least one cluster associated with the immediately lower hierarchical level, and
at the lowest hierarchical level, the output of the algorithmic submanipulation being the server address of at least one server station with which the destination station is associated.

14. The communications network of claim 13, wherein
at the highest hierarchical level, each source station comprises means for executing the algorithmic submanipulation of the destination name of each destination station to which the source station transmits communications, to obtain a representation of at least one cluster associated with the immediately lower hierarchical level,
at each hierarchical level other than the highest hierarchical level and the lowest hierarchical level, the at least one station within the at least one cluster whose representation is obtained at the immediately higher hierarchical level comprises means for executing the algorithmic submanipulation to obtain a representation of at least one cluster associated with the immediately lower hierarchical level and which is a member of the higher-level cluster,
at least lowest hierarchical level, the at least one station within the at least one cluster whose representation is obtained at the immediately higher hierarchical level comprises means for executing the algorithmic submanipulation to obtain the server address of at least one server station with which the destination station is associated and which server station is a member of the at least one cluster, and
each source station comprises means for receiving the destination address from the at least one server station.

15. The communications network of claim 14, wherein
at the highest hierarchical level, each destination station comprises means for executing the algorithmic submanipulation of its destination name, to obtain a representation of at least one cluster associated with the immediately lower hierarchical level, and each destination station comprises means for transmitting an instruction to at least one station within each at least one cluster to update the destination address of the destination station,
at each hierarchical level other than the highest hierarchical level and the lowest hierarchical level, the at least one station within each at least one cluster whose representation is obtained at the immediately higher hierarchical level comprises means for receiving the instruction, and comprises means for transmitting the instruction to at least one station within each cluster which is a member of the at least one cluster and whose representation is obtained at the present hierarchical level by means of the algorithmic submanipulation,
at the lowest hierarchical level, the at least one station within each cluster whose representation is obtained at the immediately higher hierarchical level comprises means for receiving the instruction, and comprises means for transmitting the instruction to each server station whose address is obtained at the lowest hierarchical level by means of the algorithmic submanipulation and which server station is a member of the at least one cluster, and each server station comprises means for storing the destination address or changing the destination address that the server station has stored, in response to the instruction.

whereby the destination station can transmit the instruction to each server station with which the destination station is associated.

16. The communications network of claim 15 wherein,
at least one hierarchical level, the algorithmic submanipulation comprises a first relation and a second relation,
the first relation associating each input to the algorithmic submanipulation with at least one of a plurality of elements in an intermediate hash space, and
the second relation associating each element in the intermediate hash space with at least one output of the algorithmic submanipulation.

17. The communications network of claim 16, wherein
at the lowest hierarchical level, the second relation more frequently associates the elements in the intermediate hash space with the server addresses of server stations that have a substantial capacity for storing destination addresses than with the server addresses of server stations that have a less substantial capacity for storing destination addresses, and
at all other hierarchical levels, the second relation more frequently associates the elements in the intermediate hash space with representations of clusters for which the server stations that are members of the clusters have a substantial capacity for storing destination addresses than with the representations of clusters for which the server stations that are members of the clusters have a less substantial capacity for storing destination addresses.

18. The communications network of claim 4,
one or more destination names containing a representation of the number of server stations with which the respective destination station is associated,
the algorithmic manipulation producing a plurality of outputs, and
each station that executes the algorithmic manipulation of the destination name of a destination station comprising means for receiving the representation, and comprising processing means for ignoring outputs of the algorithmic manipulation that correspond to the server name of a server station with which the destination station is not actually associated.

19. The communications network of claim 3,
each destination station being associated with a plurality of server stations, and
each source station that executes the algorithmic manipulation obtaining the destination address of each destination station from the associated server station with which the source station can most conveniently communicate.

20. The communications network of claim 19,
the number of server stations with which each destination station is associated being 3 or 4.

21. The communications network of claim 5 further comprising a plurality of subnetworks of destination stations, server stations, and source stations,
each source station that executes the algorithmic manipulation comprising processing means for selecting between two modes of the resolution relation,
in the first mode, the resolution relation having a range of the set of all server addresses of operational server stations belonging to the same subnetwork as the source station that executes the algorithmic manipulation, and
in the second mode, the resolution relation having a range of the set of all server addresses of operational server stations.

22. The communications network of claim 11 further comprising a plurality of subnetworks of destination stations, server stations, and source stations, and
each source station that executes the algorithmic manipulation comprising processing means for selecting between two modes of the second relation,
in the first mode, the second relation having a range of the set of all server addresses of operational server stations belonging to the same subnetwork as the source station that executes the algorithmic manipulation, and
in the second mode, the second relation having a range of the set of all server addresses of operational server stations.

23. In a communications network comprising a plurality of destination stations and associated server stations, each destination station having a unique destination address, each server station having a unique server address, each destination station having a unique destination name containing no predetermined indication of the address of an associated server station and no predetermined indication of a name of an associated server station, and each server station comprising means for storing the destination address of each destination station with which it is associated, a method of finding the server address of a server station associated with a destination station comprising the execution of an algorithmic manipulation of the destination name of the destination station, the algorithmic manipulation producing an output that changes in accordance with changes in a routing table containing addresses of operational server stations, so that the server address found by the algorithmic manipulation is always a server address listed on the routing table.

24. The method of claim 23, the communications network further comprising at least one source station comprising means for transmitting communications to a plurality of the destination stations.

25. The method of claim 24, further comprising the steps of
the source station executing the algorithmic manipulation of the destination name of one of the destination stations to obtain the server address of at least one server station with which the destination station is associated,
the source station transmitting a request for the destination address of the destination station to the at least one server station with which the destination station is associated,
the at least one server station transmitting the destination address to the source station in response to the request, unless the at least one server station does not actually store the destination address, and
the source station receiving the destination address from that at least one server station, unless the at least one server station does not actually store the destination address,
whereby the source station obtains the destination address of the destination station.

26. The method of claim 24, further comprising the steps of one of the destination stations executing the algorithmic manipulation of its destination name to obtain the server address of each server station with which the destination station is associated, the destination station transmitting an instruction to each server station with which the destination station is associated to store the destination address, and each server station with which the destination station is associated storing the destination address in response to the instruction, whereby the destination station updates its destination address.

27. The method of claim 24, each source station comprising means for executing the algorithmic manipulation of the destination name of each destination station to which the source station transmits communications, to obtain the server address of at least one server station with which the destination station is associated, and comprising means for transmitting a request for the destination address of the destination station to the at least one server station with which the destination station is associated, the at last one server station comprising means for transmitting the destination address to the source station in response to the request, unless the at least one server station does not actually store the destination address, and the source station comprising means for receiving the destination address from the at least one server station, unless the at least one server station does not actually store the destination address, each destination station comprising means for executing the algorithmic manipulation of its destination name to obtain the server address of each server station with which the destination station is associated, and comprising means for transmitting an instruction to each server station with which the destination station is associated to store the destination address, and each server station with which the destination station is associated comprising means for storing the destination address in response to the instruction, whereby the destination station can update its destination address.

28. The method of claim 27, the algorithmic manipulation comprising a hash relation and a resolution relation, the hash relation having a domain comprising each destination name and having a range comprising a plurality of addresses, the hash relation associating each destination name with at least one address, and the resolution relation having a domain comprising each address in the range of the hash relation and having a range comprising each server address of an operational server station, the resolution relation associating each address in the range of the hash relation with a server address of an operational server station.

29. The method of claim 28, each server address having a unique rank, and the output of the resolution relation of any input address being the address having the lowest rank that is greater than or equal to the rank of the input address and that is the rank of a server address of an operational server station.

30. The method of claim 29, wherein, if there is no rank that is greater than or equal to the input address and that is the rank of a server address of an operational server station, the output of the resolution relation of any input address is the address having the lowest rank that is the rank of a server address of an operational server station.

31. The method of claim 27, each destination station also being a source station with respect to all destination stations other than itself, and each source station also being a destination station with respect to all source stations other than itself.

32. The method of claim 31, each server station also being a destination station and a source station.

33. The method of claim 32, each destination station also being a server station, and each source station also being a server station.

34. The method of claim 27, the algorithmic manipulation comprising a first relation and a second relation, the first relation associating each destination name with at least one of a plurality of elements in an intermediate hash space, and the second relation associating each element in the intermediate hash space with at least one server address of an operational server station.

35. The method of claim 34, the second relation more frequently associating the elements in the intermediate hash space with the server addresses of server stations having a substantial capacity for storing destination addresses than with the server addresses of server stations having a less substantial capacity for storing destination addresses.

36. The method of claim 24, a plurality of clusters of the source stations, of the destination stations, and of the server stations being associated with a lowest hierarchical level, and one or more clusters of lower-level clusters being associated with one or more successively higher hierarchical levels, the algorithmic manipulation of the destination address of a destination station comprising the reiteration, at each hierarchical level, of an algorithmic submanipulation, at each hierarchical level other than the lowest hierarchical level, the output of the algorithmic submanipulation being a representation of at least one cluster associated with the immediately lower hierarchical level, and at the lowest hierarchical level, the output of the algorithmic submanipulation being the server address of at least one server station with which the destination station is associated.

37. The method of claim 36, further comprising the steps of at the highest hierarchical level, the at least one source station executing the algorithmic submanipulation of the destination name of one of the destination stations, to obtain a representation of at least one cluster associated with the immediately lower hierarchical level, at each hierarchical level other than the highest hierarchical level and the lowest hierarchical level, the at least one station within the at least one cluster whose representation is obtained at the immediately higher hierarchical level executing the algorithmic submanipulation, to obtain a representation of at least one cluster associated with the immediately lower hierarchical level and which is a member of the higher-level cluster, at the lowest hierarchical level, the at least one station within the at least one cluster whose representation is obtained at the immediately higher hierarchical level executing the algorithmic submanipulation, to obtain the server address of at least one server station with which the destination station is associated and which is a member of the at least one cluster, and the source station obtaining the destination address from the at least one server station.

38. The method of claim 36, further comprising the steps of at the highest hierarchical level, the destination station executing the algorithmic submanipulation of the destination name of the destination station, to obtain a representation of at least one cluster associated with the immediately lower hierarchical level, and the destination station transmitting an instruction to at least one station within each at least one cluster to update the destination address of the destination station, at each hierarchical level other than the highest hierarchical level and the lowest hierarchical level, the at least one station within each at least one cluster whose representation is obtained at the immediately higher hierarchical level executing the algorithmic submanipulation of the destination name of the destination station, to obtain a representation of at least one cluster associated with the immediately lower hierarchical level and which is a member of the higher-level cluster, and the at least one station within each at least one cluster whose representation is obtained at the immediately higher hierarchical level receiving the instruction, and transmitting the instruction to at least one station within each cluster which is a member of the at least one cluster and whose representation is obtained at the present hierarchical level by means of the algorithmic submanipulation, at the lowest hierarchical level, the at least one station within each cluster whose representation is obtained at the immediately higher hierarchical level executing the algorithmic submanipulation of the destination name of the destination station, to obtain the server address of at least one server station with which the destination station is associated and which is a member of the at least one cluster, and the at least station within each at least one cluster whose representation is obtained at the immediately higher hierarchical level receiving the instruction, and transmitting the instruction to each server station whose address is obtained at the lowest hierarchical level by means of the algorithmic submanipulation and which server station is a member of the at least one cluster, and each server station storing the destination address, in response to the instruction, where by the destination station transmits the instruction to update its address to each server station with which the destination station is associated.

39. The method of claim 36, wherein, at least one hierarchical level, the algorithmic submanipulation comprises a first relation and a second relation, the first relation associating each input to the algorithmic submanipulation with at least one of a plurality of elements in an intermediate hash space, and the second relation associating each element in the intermediate hash space with at least one output of the algorithmic submanipulation.

40. The method of claim 39, wherein at the lowest hierarchical level, the second relation more frequently associates the elements in the intermediate hash space with the server addresses of server stations that have a substantial capacity for storing destination addresses than with the server addresses of server stations that have a less substantial capacity for storing destination addresses, and at all other hierarchical levels, the second relation more frequently associates the elements in the intermediate hash space with representations of clusters for which the server stations that are members of the clusters have a substantial capacity for storing destination addresses than with the representations of clusters for which the server stations that are members of the clusters have a less substantial capacity for storing destination addresses.

41. The method of claim 27, one or more destination names containing a representation of the number of server stations with which the respective destination station is associated, the algorithmic manipulation producing a plurality of outputs, and the method further comprising the steps of receiving the representation, and ignoring outputs of the algorithmic manipulation that correspond to the server name of a server station with which the destination station is not actually associated.

42. The method of claim 25, each destination station being associated with a plurality of server stations, and each source station that executes the algorithmic manipulation obtaining the destination address of each destination station from the associated server station with which the source station can most conveniently communicate.

43. The method of claim 42, the number of server stations with which each destination station is associated being 3 or 4.

44. The method of claim 28, the communications network further comprising a plurality of subnetworks of destination stations, server stations, and source stations, the method further comprising the step of the source station selecting between two modes of the resolution relation, in the first mode, the resolution relation having a range of the set of all server addresses of operational server stations belonginq to the same subnetwork as the source station, and in the second mode, the resolution relation having a range of the set of all server addresses of operational server stations.

45. The method of claim 34, the communications network further comprising a plurality of subnetworks of destination stations, server stations, and source stations, the method further comprising the step of selecting between two modes of the second relation, in the first mode, the second relation having a range of the set of all server addresses of operational server stations belonginq to the same subnetwork as the source station, and in the second mode, the second relation having a range of the set of all server addresses of operational server stations.

* * * * *

UNITED STATES PATENT AND TRADEMARK OFFICE
CERTIFICATE OF CORRECTION

PATENT NO. : 5,025,491
DATED      : June 18, 1991
INVENTOR(S) : Paul F. Tsuchiya, et. al.

It is certified that error appears in the above-indentified patent and that said Letters Patent is hereby corrected as shown below:

```
Column 5, line 12, replace "last" with --least--.
Column 6, line 38, replace "drawing" with --drawings--.
Column 8, line 6, replace "K" with --k--.
Column 8, line 14, replace "doman" with --domain--
Column 8, line 35, after "course, " insert --it--.
Column 10, line 21, delete "28" with --22--.
Column 10, line 21, before "maps" insert --consists of two mapping functions
45 and 47.  The first mapping functions 45 and 47.
Column 10, line 24, replace "44" with --46--.
Column 12, line 12, replace "in" with --with--.
Column 14, line 21, after "at" insert --the--.
```

Signed and Sealed this

Eleventh Day of January, 1994

*Attest:*

BRUCE LEHMAN

*Attesting Officer*     Commissioner of Patents and Trademarks